Patented Nov. 24, 1925.

1,563,086

UNITED STATES PATENT OFFICE.

CHARLES W. HOOPER, OF JAMAICA, NEW YORK, ASSIGNOR TO H. A. METZ LABORATORIES, INC., OF NEW YORK, N. Y., A CORPORATION OF NEW YORK.

MORPHINE SOLUTION.

No Drawing.   Application filed October 8, 1924. Serial No. 742,425.

*To all whom it may concern:*

Be it known that I, CHARLES W. HOOPER, a citizen of the United States, and resident of Jamaica, County of Queens, and State of New York, have invented certain new and useful Improvements Relating to Morphine Solutions, of which the following is a specification.

My invention relates to morphine solutions and more particularly, to improvements whereby such solutions are rendered sterile and stable. Also according to my improvements in a preferred form thereof, the solutions are characterized by great analgesic potency. Further and more specific objects, features and advantages will more clearly appear from the detail descriptive given below.

The hypodermic injection of morphine in aqueous solution has achieved great therapeutic importance and has been used universally as an analgesic agent in surgery and for the alleviation of human suffering in disease. Heretofore it has been necessary to prepare the hypodermic solution by dissolving a morphine tablet in a small amount of boiling water immediately before use. These solutions are not necessarily sterile and as a result frequently give rise to painful tissue reactions at the site of the injection with the formation of infiltrates, necroses, and at times even abscesses. The solutions are so prepared immediately before use because morphine in aqueous solution decomposes on standing due to the action of bacteria and molds; and furthermore such aqueous solutions of morphine are not capable of being sterilized by boiling or autoclaving without oxidizing the morphine or changing it so that if it were used in the changed condition, it would not have the desired analgesic effect, since the oxidation products of morphine are therapeutically relatively inert. Both of these characteristics are such as to prevent the employment of morphine in ready to use stock solutions either in the hospital or as a stock in trade.

According to my improvements, however, a morphine solution is produced which is not only sterile, but it may be kept for long periods of time ready to use as stock solution of morphine and it does not produce the painful tissue reactions at the site of injection as heretofore. I have discovered that such a stable sterile solution of morphine can be prepared by including therein a stabilizing agent preferably in the nature of a reducing agent which so affects the morphine as to prevent its oxidation and therefore its deterioration when sterilized by boiling or autoclaving. When I refer to morphine or solution of morphine it will be understood that this includes the various forms in which morphine is or may be used for the purposes in question, e. g., in the form of any of its salts. For a stabilizing or reducing agent I prefer to use sodium bisulphite and the solution is preferably made by dissolving a sufficient quantity of the sodium bisulphite in the morphine solution to prevent the oxidation which normally occurs when morphine in aqueous solution is boiled. However, other reducing or stabilizing agents may be employed, for example other sulphur compounds and particularly the sulphurous compounds such as hyposulphurous acid or its salts, sulphurous acid, other bisulphites, sulphur dioxide, etc. These stabilizing or reducing agents when so employed have the characteristic of being able to practically prevent the oxidation which occurs in aqueous solutions of morphine when the solution is sterilized by boiling or autoclaving. The introduction of such reducing agents prevents this oxidation and thereby produces a desired stabilized solution, the morphine remaining stable in its solution form. In producing such a solution the proportions of stabilizer to morphine may vary depending on the particular conditions to be met, but I find that where the stabilizer is in the form of sodium bisulphite, a suitable proportion for the solution is as follows: Morphite sulphate 0.5 gram, sodium bisulphite 0.1 gram, and distilled water in sufficient quantity to make 100 cubic centimeters. While these proportions give excellent results I have used slightly smaller quantities of the stabilizer as well as larger quantities without harmful effect upon the working qualities of the solution.

In order to better sterility, I prefer to fill glass ampules of the desired volume with the freshly prepared solution, seal the ampules off with the aid of a blowpipe in the manner well understood by those skilled in the art, and then submerge the sealed ampules in boiling water for 15 to 30 minutes or subject them to live steam in an autoclave for a like period. This thoroughly sterilizes the solutions in the sealed ampules and the presence of the stabilizing agent prevents any deterioration of the morphine due to such sterilization and the morphine ampules may then be kept for long periods of time with the solution remaining in stable sterile condition. By sterilizing the solution while sealed in ampules as above described, any accidental contamination after sterilization is prevented and also all loss by evaporation of any of the ingredients of the solution is prevented so that by thus holding the solution in sealed ampules the stabilizing agent is made more effective. I also believe the stabilizing agent in addition to the function noted also acts to reduce the time required to boil the solution in sterilizing and also tends to maintain the solution sterile after the ampules have been opened.

I have also found that the addition of magnesium sulphate or equivalent magnesium salt to the morphine solution acts as an additional safeguard against oxidation of the morphine during sterilization. In some cases this may be substituted entirely for the sulphur reducing agent. When using magnesium sulphate in the solution, I preferably use from 25 to 50 grams of magnesium sulphate ($M_gSO_4 + 7H_2O$) in the 100 c. c. of morphine solution above mentioned. However, the proportion of magnesium salt employed may vary even more greatly. The magnesium sulphate I believe not only acts as an aid to the stabilizing agent in preventing oxidation or deterioration of the morphine solution, since I find that the amount of stabilizer can be reduced in the presence of magnesium sulphate, but it also seems to act synergistically on the morphine, intensifying the therapeutic effect of the morphine.

Instead of using the magnesium salt in the solution or in addition thereto, I may add an alkamine ester of aromatic acid of the class of anæsthetics which are adapted for use as local anæsthetics, such as monohydrochloride of para-amino-benzoyl-diethyl-amino-ethanol (novocaine). This also appears to act synergistically on the morphine increasing greatly the analgesic potency of the solution when injected hypodermically without increasing the toxicity of the solution. This combination also prevents the salivation, nausea and vomiting that frequently follow the use of simple morphine solutions. By means of animal experiments I have also been able to show that it prevents the development of tolerance to the morphine and therefore should counteract the habit forming properties of the drug. I find that when the above described solution is used as a preliminary medication for surgical operations, post-operative analgesia is seldom required. The addition of the novocaine or other alkamine ester of an aromatic acid seems to increase the action of both the morphine and magnesium sulphate, greatly intensifying the therapeutic effect of the solution. The amount of alkamine ester of an aromatic acid to be used may vary considerably according to conditions. When using novocaine I prefer to use the same in proportion of about 2.5 grams in the 100 cubic centimeters of morphine solution above described. I have obtained excellent results with other proportions of novocaine, varying from 2 to 10 grams in the 100 cubic centimeters solution above described. As above indicated other alkamine esters of aromatic acids can be used in place of the novocaine and other magnesium salts such as magnesium chloride may be used in place of the magnesium sulphate.

Morphine solutions which I made and put up in ampules as above described are now approximately a year old, and they are still water clear and have retained full analgesic potency. I have had such solutions tested for various purposes for which morphine would be employed in a hospital and results have been very satisfactory. It is found that on hypodermic injections they do not give rise to painful tissue reactions, heretofore common with morphine hypodermic injections. By my improvements I am able to produce ready to use aqueous solutions of morphine for analgesic purposes which are far superior to the morphine solutions heretofore employed and which do not produce the painful tissue reaction when injected hypodermically. Also I have eliminated the oxidation which has heretofore taken place when such solutions are sterilized by boiling or autoclaving and I have rendered the solution stable so that it may be employed as a stock solution either in the hospital or as a stock in trade.

While I have described my improvements in great detail and with respect to preferred forms thereof, I do not desire to be limited to such details or forms since many modifications and changes may be made, the proportions may be varied and certain of the ingredients omitted to meet various uses to which the solution is to be put and the invention may be embodied in widely different forms without departing from the spirit and scope thereof in its broader aspects. Hence I desire to cover all modifications and forms coming within the scope or language of any one or more of the appended claims.

What I claim as new and desire to secure by Letters Patent is:

1. A solution of morphine containing a sulphur reducing agent to stabilize and prevent oxidation of the morphine.

2. A solution of morphine sealed in an ampule with a sulphur reducing agent adapted to prevent oxidation when heated to sterilize.

3. A solution of morphine and magnesium sulphate containing a sulphur reducing agent to stabilize and prevent oxidation of the morphine.

4. A solution of morphine and a magnesium salt sealed in a glass ampule with a sulphur stabilizing agent.

5. A solution of morphine and magnesium sulphate sealed in an ampule with a reducing agent to prevent oxidation when heated to sterilize.

6. A solution of morphine and magnesium sulphate containing novocaine which acts to intensify the therapeutic effect of the morphine when injected hypodermatically.

7. A solution of morphine and novocaine sealed in a glass ampule.

8. A solution of morphine containing a sulphur reducing agent to stabilize and prevent oxidation of the morphine, and novocaine to intensify the therapeutic effect of the morphine.

9. A solution of morphine and magnesium sulphate and novocaine to intensify the therapeutic effect of the morphine when injected hypodermatically, the solution being sealed in a glass ampule.

10. A solution of morphine containing a sulphur reducing agent and a magnesium salt and novocaine to intensify the therapeutic effect of the morphine when injected hypodermatically.

11. A solution of morphine and magnesium sulphate and novocaine containing a sulphur reducing agent to stabilize and prevent oxidation of the morphine.

12. The method of preparing morphine solution which consists in making a solution of morphine, magnesium sulphate and novocaine, sealing off the solution in ampules and then heating the solution in the ampules to sterilize the same.

13. A sterile stable solution of morphine containing a stabilizing agent consisting of a salt of a sulphurous acid to prevent oxidation of the morphine in solution on boiling to pseudo-morphine.

14. The method of preparing morphine solutions which consists in making a solution of morphine containing a sulphur stabilizing agent, sealing off the solution in glass ampules and then heating the solution in the ampules to sterilize the same.

15. A sterile stable solution of morphine in water containing novocaine and magnesium sulphate and sodium bisulphite in the proportion of about 100 c. c. of water, about 0/5 gram morphine, 2.5 gram of novocaine, about 50 grams of magnesium sulphate and about 0.1 gram of sodium bisulphite.

In testimony whereof I have signed my name to this specification.

CHARLES W. HOOPER.